UNITED STATES PATENT OFFICE.

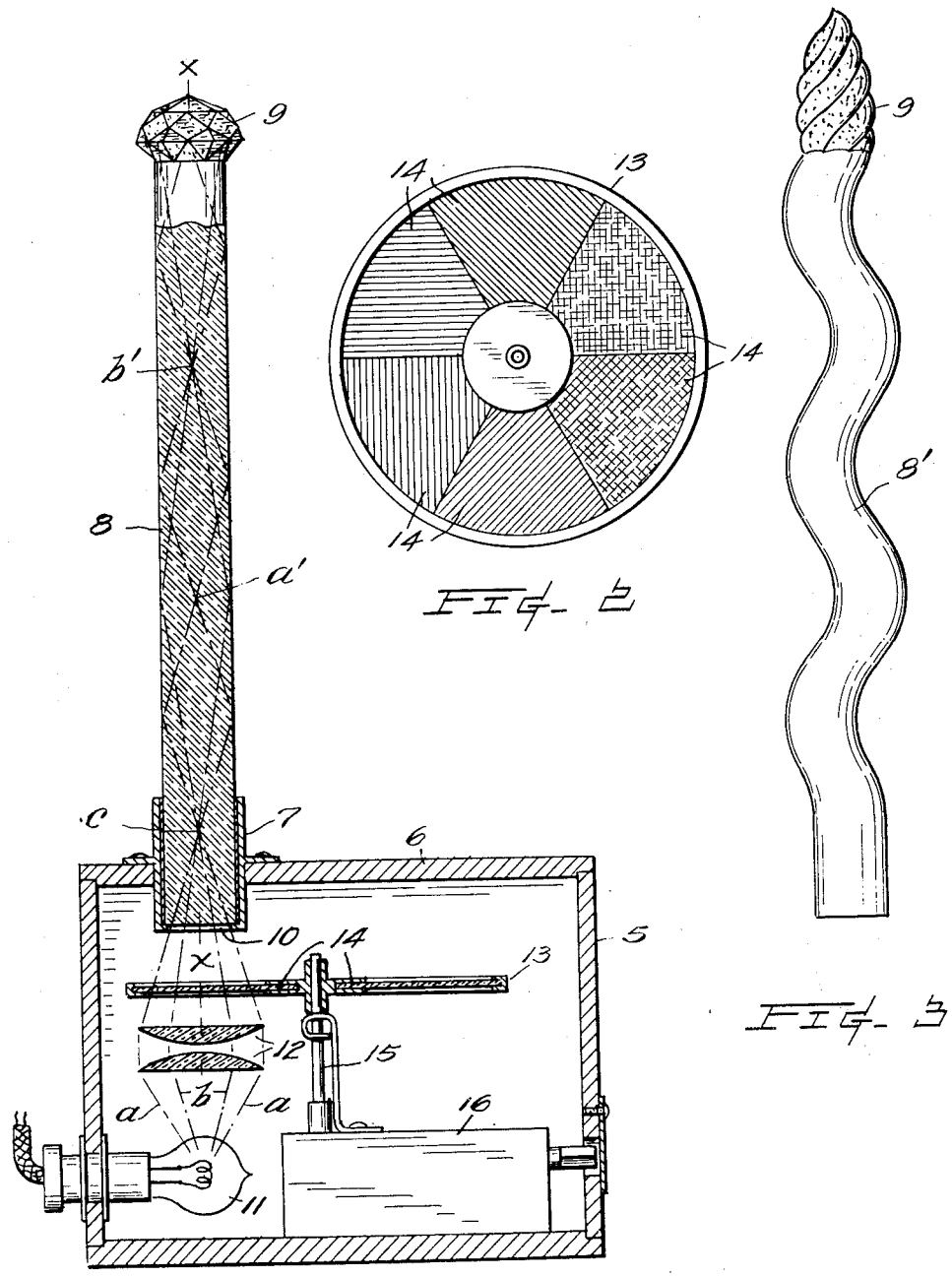

DONOVAN FOSTER, OF SEATTLE, WASHINGTON, ASSIGNOR OF ONE-FOURTH TO J. B. WADMAN, OF SEATTLE, WASHINGTON.

ILLUSION APPARATUS.

1,351,562. Specification of Letters Patent. Patented Aug. 31, 1920.

Application filed September 10, 1919. Serial No. 322,801.

*To all whom it may concern:*

Be it known that I, DONOVAN FOSTER, a citizen of the United States, residing at Seattle, in the county of King and State of Washington, have invented certain new and useful Improvements in Illusion Apparatus, of which the following is a specification.

This invention relates to optical apparatus; and its object is to produce an illusion device of this character which is designed, more especially, for advertising or decorative purposes, such, for example, as in window displays or illuminating a room or the like in a most interesting and attractive manner.

The invention involves the principle in optics whereby light rays suitably introduced into one end of a glass rod will be transmitted longitudinally through a transparent portion thereof of uniform density without brightening the same when viewed transversely but will illuminate the outer end of the rod when such extremity is translucent, as by being ground or frosted, to render it light diffusing.

Light transmitted through a clear glass rod free from imperfections thus remains invisible irrespective of the color of the light until diffused by a translucent object placed in the light path which will be caused to appear the real source of light.

Changing the colors of the light beams before entering the rod correspondingly changes the color of the light diffusing portion or object provided at the outer end of the rod.

The invention consists in the novel construction, arrangement and combination of devices as will be hereinafter described and claimed.

In the drawings, Figure 1 is a view, shown partly in side elevation and partly in transverse vertical section, of apparatus embodying the present invention. Fig. 2 is a plan view of the color disk, shown detached. Fig. 3 is a side elevational view of a light conducting rod of a design somewhat different from the rod shown in Fig. 1.

In said drawings, and referring first to Figs. 1 and 2, the numeral 5 designates a cabinet having in its top 6 an opening to receive a socket 7, for an upright rod 8. This rod as shown is of a transparent material such as clear glass except its upper end which is formed to provide an object 9 to resemble, for example, a cut jewel, and having its facets ground or frosted.

The lower end of the socket 7 is provided with an aperture 10 for the admission of light beams from a source of light such as the filament of an electric lamp 11 which, as shown, is located in alinement with the axis $x$—$x$ of said rod. 12 represents a pair of condensing lenses disposed between said lamp and the rod and with their optical axis in alinement with the rod axis.

Said lenses are furthermore arranged to have its rear focus, so called, in the source of light so that the rays, such as indicated by $a$ and $b$, will cross each other at the conjugate focus; and at $a^1$ and $b^1$ when respectively reflected at the periphery of the rod. The rays are thus projected into the object 9 which by reason of its light diffusing surface or surfaces is illuminated. The transparent light conducting medium or rod may be round or of polygonal shape in cross section and may be either straight or curved longitudinally, a helical form $8^1$ being shown in Fig. 3.

The translucent object at the outer end of the rod may be of any suitable design, so as to represent, for example, a candle flame, flower, jewel, etc., provided the surface thereof is rendered capable of diffusing light.

Included in the invention, are means which afford various color effects to the object. Such means, as illustrated, consists of a disk or wheel 13 comprising a plurality of colored glass sector elements 14 mounted on an upright shaft 15 of a motor indicated by 16. The disk 13 is arranged to have the colored elements 14 thereof revoluble through the paths of light rays prior to the latter entering the rod, resulting in changing the colors of the object to the observer's eyes.

What I claim, is—

1. An optical illusion apparatus comprising a cabinet provided with an opening, a transparent glass rod connected to said cabinet at the opening thereof, an object on the end of said rod remote from the cabinet, said object being provided with a light diffusing surface and a source of light provided within said cabinet and arranged in alinement with the axis of said rod.

2. An optical illusion apparatus comprising a cabinet provided with an opening, a transparent glass rod connected to said cabinet at the opening thereof, an object on the end of said rod remote from the cabinet, said object being provided with a light diffusing surface, a source of light provided within said cabinet, and condensing lenses provided in the cabinet between the source of light and the rod.

3. An optical illusion apparatus comprising a rod of transparent material having one of its ends formed with a light diffusing surface, a source of light arranged in axial alinement with said rod, and an apertured support for the rod, said support serving to confine the light rays passing through said support to the rod diffusing surface whereby the surface is illuminated exclusively.

4. An optical illusion apparatus comprising a transparent glass rod having one of its ends formed with a light diffusing surface, a cabinet having in one of its walls, a socket for said rod secured to the cabinet at the hole thereof, said socket being provided with an aperture opening into the cabinet, a source of light, condensing lenses provided in the cabinet between said source of light and the rod for directing light rays into the latter, and means provided interiorly of the cabinet for changing the color of the light rays supplied through the apertured socket into said rod.

5. In an optical illusion apparatus, a transparent glass rod having one of its ends formed with a light diffusing surface, and means whereby light is transmitted longitudinally through the rod to illuminate said surface.

Signed at Seattle, Washington, this 4th day of September, 1919.

DONOVAN FOSTER.

Witnesses:
PIERRE BARNES,
ELIZABETH JOHNSON.